(12) United States Patent
Scott

(10) Patent No.: US 6,886,290 B2
(45) Date of Patent: May 3, 2005

(54) SYSTEM FOR REDUCING THE NUMBER OF PREDATOR FISH

(76) Inventor: Bradford L. Scott, 845 Evergreen Rd., Sagle, ID (US) 83860

( * ) Notice: Subject to any disclaimer, the term of this patent is extended or adjusted under 35 U.S.C. 154(b) by 0 days.

(21) Appl. No.: 10/461,555

(22) Filed: Jun. 12, 2003

(65) Prior Publication Data
US 2004/0250460 A1 Dec. 16, 2004

(51) Int. Cl.[7] .............................................. A01K 61/00
(52) U.S. Cl. ................................ 43/4.5; 43/1; 119/215
(58) Field of Search ......................... 43/1, 4.5; 119/215, 119/860

(56) References Cited

U.S. PATENT DOCUMENTS

| | | | |
|---|---|---|---|
| 254,156 A | * | 2/1882 | Ricker et al. ............... 119/654 |
| 1,349,665 A | * | 8/1920 | Duncombe .................. 119/855 |
| 2,791,202 A | * | 5/1957 | Doyle ......................... 119/654 |
| 3,264,772 A | * | 8/1966 | Hart ............................. 43/4.5 |
| 3,602,194 A | | 8/1971 | Marking |
| 4,221,782 A | | 9/1980 | MacPhee et al. |
| 4,338,886 A | * | 7/1982 | McBride ..................... 119/855 |
| 4,350,679 A | * | 9/1982 | Mizuno et al. ............. 424/456 |
| 4,395,969 A | | 8/1983 | Cheng et al. |
| 4,464,317 A | | 8/1984 | Thies et al. |
| 4,707,355 A | * | 11/1987 | Wilson ......................... 424/84 |
| 4,731,247 A | | 3/1988 | Wolford et al. |
| 4,790,090 A | | 12/1988 | Sharber |
| 4,874,611 A | * | 10/1989 | Wilson et al. ............... 424/410 |
| 4,970,988 A | * | 11/1990 | Heisey ........................ 119/215 |
| 5,089,277 A | | 2/1992 | Prochnow |
| 5,674,518 A | | 10/1997 | Fajt |
| 5,761,843 A | * | 6/1998 | Lynch et al. .................. 43/4.5 |
| 6,004,571 A | * | 12/1999 | Thies .......................... 424/410 |
| 6,164,244 A | | 12/2000 | Cutler et al. |
| 6,391,295 B1 | | 5/2002 | Novitsky et al. |
| 2003/0208945 A1 | * | 11/2003 | Hill ................................. 43/4 |

FOREIGN PATENT DOCUMENTS

| | | |
|---|---|---|
| JP | 1060321 A2 | 3/1989 |
| JP | 4293444 A2 | 10/1992 |
| WO | WO 98/54958 | 12/1998 |

* cited by examiner

*Primary Examiner*—Kurt Rowan
(74) *Attorney, Agent, or Firm*—Jensen & Puntigam, P.S.

(57) ABSTRACT

The system includes a capsule member made from a material which is not dissolvable in water but is dissolvable in the digestive fluids of a predator fish. The capsule contains a material which, following ingestion by a predator (game/sport) fish, results in death of the predator fish. A connecting member is secured to the capsule, and is adapted to be secured to a prey (bait) fish such that when the prey fish is released in a body of water, such as a lake, in the vicinity of the predator fish, the predator fish is likely to consume the prey fish along with the capsule and shortly thereafter dies, thereby reducing the number of predator fish relative to the number of prey fish.

17 Claims, 1 Drawing Sheet

SYSTEM FOR REDUCING THE NUMBER OF PREDATOR FISH

TECHNICAL FIELD

This invention relates generally to the reduction of predator fish in selected aqueous environments such as lakes, streams and the like, and more particularly concerns a system using a bait fish to accomplish such a reduction of predator fish.

BACKGROUND OF THE INVENTION

In aqueous environments, such as lakes, that normally have a balance of predator and prey fish (also referred to as bait fish) populations, the prey fish are abundant enough to adequately support the predator fish population. The predator fish, which generally are desirable game or sport fish, are in turn usually caught in sufficient numbers by fishermen to maintain control over the number of their population.

Under various circumstances, however, an imbalance may occur in which the game fish significantly outnumber the prey fish, which are then consumed at a rate such as to threaten the continued existence of the prey fish, which in turn threatens the future existence of the game fish. In addition, other various factors can independently affect the population of the prey fish, including changes in the water level, which may expose the prey fish spawning beds, and high water flow periods, which may wash prey fish downstream. Other weather and environmental factors can also have a detrimental effect on the number of prey fish.

In such circumstances, it is important to quickly reduce the number of predator fish. Historically, one method is to poison the entire body of water, and then restock with the appropriate numbers of predator and prey fish populations. U.S. Pat. No. 4,395,969 to Cheng and U.S. Pat. No. 4,221,782 to MacPhee are examples of such a method. In addition, in some cases, fishing regulations are temporarily modified in order to increase the number of predator/game fish caught by fishermen, thereby reducing the threat to the prey fish. However, this particular method has not proven to be a reliable or significant solution to the problem.

With respect to a solution, it is desirable to be able to reliably control/reduce the numbers of predator fish in a given body of water without having to completely poison the body of water.

SUMMARY OF THE INVENTION

Accordingly, the present invention is a system and corresponding method for controlling the number of a selected population of fish, such as a predator (game/sport) fish, in a given aqueous environment, comprising: a capsule member which includes material which, following ingestion by a fish in the selected population, results in death of said fish, wherein the capsule is made from a material which dissolves in the digestive fluids of said fish; and a connecting member attached to the capsule and adapted to be secured to a prey fish which is released into the aqueous environment and consumed by said selected population fish.

BEST MODE FOR CARRYING OUT THE INVENTION

Figure 1:
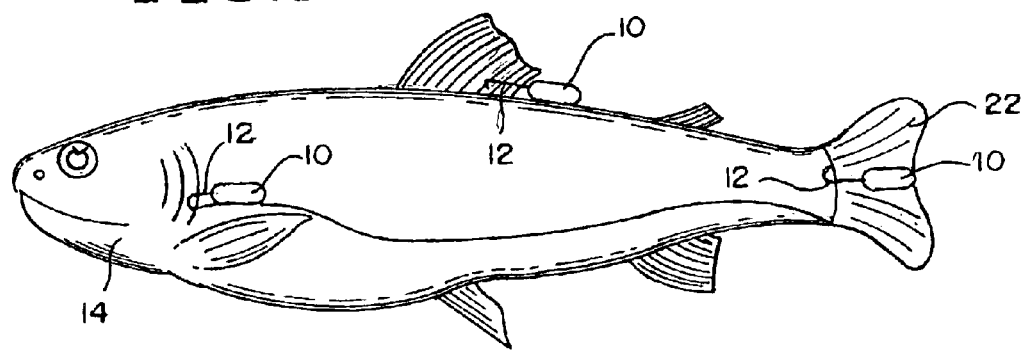
FIG. 1 shows a bait fish which is to be consumed by a predator/game fish, with the capsule portion of the present invention shown attached thereto.

Referring to FIG. 1 in general, the present invention comprises a small capsule 10 which is attached by means of a wire or similar lead element 12 to a prey/bait fish 14, which is a species typically attractive to and hence likely to be consumed by a predator/game fish. The capsuled prey fish are introduced in a given body of water in which there is an imbalance in numbers between the prey fish and the predator fish, favoring the predator fish. The capsule 10 includes a substance 16, typically a poison, which in action operates to kill the predator fish when the predator fish ingests the prey fish. This results in the reduction of the number of predator fish in the body of water.

Figure 2A:
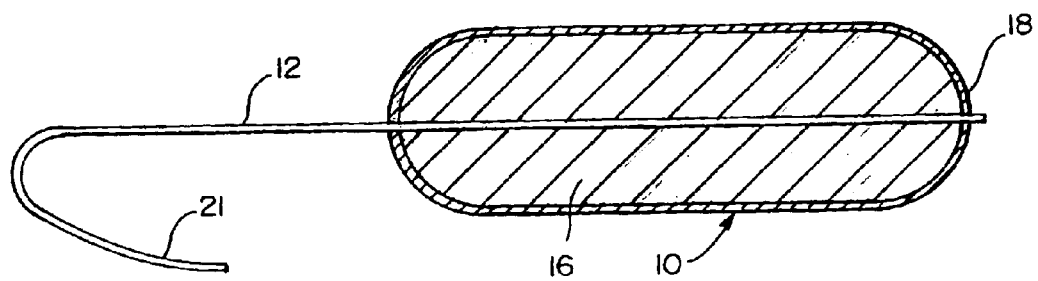
FIGS. 2A and 2B show perspective views of two embodiments of the capsule portion of the present invention, for attachment to a prey/bait fish.
Figure 2B:
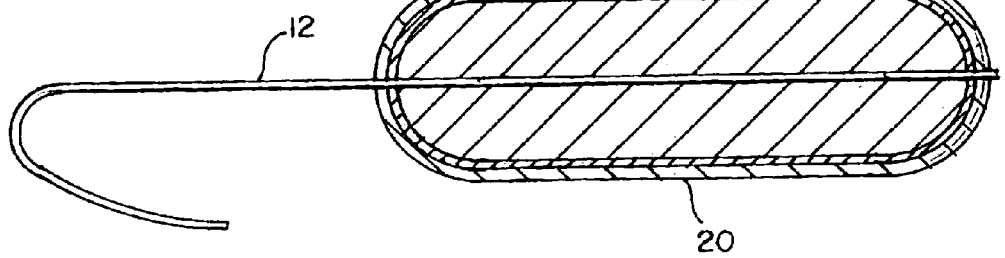

Referring to FIG. 1, capsule 10 itself in one embodiment is a gelatinous material, similar to ingestible capsules used by humans for various health care purposes (pain treatment, supplements, etc.). In one embodiment, capsule 10 is approximately ½-inch long with a diameter approximately one-third of its length. These dimensions can of course vary. In one embodiment, shown in FIG. 2A, the material comprising the capsule does not dissolve in water but only in the digestive fluids of the predator fish. Alternatively, the capsule could have a wax or other coating 20 (shown in FIG. 2B), which would prevent dissolution of the capsule in water when the capsule comprises a water-soluble material.

Capsule 10 in one embodiment contains a liquid poison which is injected into the capsule by various means; alternatively, the capsule could be molded around a dry poisonous chemical. In both cases, the amount/potency is sufficient to kill the predator fish ingesting the capsule. Typically, the poison has a very short life, so that other species or animals could consume the carcass of the predator fish without harm. Further, the poison will also typically be very fast-acting, so that the predator fish consuming it will die quickly, before it has the opportunity to consume other prey fish. Example of such chemicals, which would provide such desired results, are sodium hydroxide and hydrochloric acid. Other fast-acting poisons are of course possible.

In another embodiment, the contents of the capsule 10 is a strong sedative, which results in the predator fish becoming unconscious and then drowning. In still other alternatives, the material in capsule 10 could be of a kind which would cause other harm sufficient to kill the predator fish, but without poisonous chemicals. One example would be the use of a sponge-like member within a capsule which, when exposed to the fluids in the stomach of the predator fish, expands sufficiently to block the digestive track of the predator fish, thereby causing the death of the predator fish. In another alternative, the capsule material itself could be poisonous or include a sedative.

Further, the contents of the capsule could include a dye, which alternatively or in addition to killing predator fish, could provide information on the feeding patterns of the predator fish.

The capsule 10, as indicated above, is attached to the prey fish 14 by a connecting element, such as a thin wire 12, as shown in the figures. The capsule 10 could be molded around or impaled on an end 18 of wire 12; the other end 21 of the wire can then be arranged in a hook pattern, for instance, and attached to the tail fin 22 or other fin of the prey fish, as shown in FIG. 1. Typically, the length of the wire connecting element 12 will be approximately three inches long, to facilitate the attachment of the capsule to the prey fish. This length results in the capsule being maintained relatively close to the skin surface of the prey fish and be generally unnoticed by the predator fish, although the attached capsule may cause the prey fish to act slightly wounded, because of the weight/drag of the capsule. This is typically attractive, however, to a predator fish.

An alternative to wire is a dissolvable line, such as animal sinew or intestine, or casing material such as used for sausages, which results in the capsule being released from the prey fish after a selected period of time. This has the advantage of preventing a prey fish which is not consumed by a predator fish but is instead caught by a fisherman exposing the capsule to humans because of the wire line attachment. The dissolvable line also prevents the capsule from continuing to be attached to a dead bait fish, which might otherwise float to the surface and be available (and dangerous) to curious humans on the shoreline of the water.

While the prey/bait fish in the embodiment shown is attached to a fin 22 of the prey fish, it should be understood that the capsule could be attached to other portions of the prey fish as well. The capsule could also be secured by an adhesive, or other means, or could be placed under the skin of the prey fish. As indicated above, the capsule will typically have an effect on the movement of the prey fish and thus make the prey fish more attractive to the predator fish. The capsule can be colored to resemble the bait fish or, alternatively, be brightly colored to attract predator fish.

In use, the bait fish with the attached capsule can be introduced to a predator fish by a conventional fish locator to first determine the location, depth and size of the predator fish, and then lowering the bait fish with the attached capsule to a location in a net enclosure, which has a release gate, controlled at the surface. The prey fish will swim out of the enclosure, to be consumed by the predator fish, which will then shortly die, as discussed above.

As indicated above, if a poison is used, the predator fish will be quickly killed by the poison; the predator fish is then either consumed by another species or animal, or simply dissolves in the water. Use of a sedative will result in the drowning of predator fish. The placement of a sufficient number of prey fish with an attached capsule in a selected aqueous environment will result in a significant reduction of the number of predator fish, with a goal of reaching a desired balance between the predator fish and the prey fish in that environment.

Although a preferred embodiment of the invention has been disclosed here for purposes of illustration, it should be understood that various changes, modifications and substitutions might be incorporated in the invention without departing from the spirit of the invention, which is defined by the claims which follow.

What is claimed is:

1. A system for controlling the number of a selected population of fish in a given aqueous environment, comprising:
   a capsule member which includes material which, following ingestion by a fish in the selected population, results in death of said selected population fish, wherein the capsule is made from a material which dissolves in the digestive fluids of said fish, wherein the capsule is secured to a prey fish which is released into the aqueous environment for ingestion by said selected population fish; and
   a connecting element for securing the capsule to the prey fish.

2. A system of claim 1, wherein said death causing material is lethal to the selected population of fish or sedates the fish so that they drown.

3. A system of claim 1, wherein the capsule member is covered with a substance which is not dissolvable in water.

4. A system of claim 3, wherein said substance is wax.

5. A system of claim 1, wherein the capsule itself is not dissolvable in water.

6. A system of claim 1, wherein the connecting member is a thin, flexible wire.

7. A system of claim 1, wherein the connecting member is dissolvable in water after a selected period of time.

8. A system of claim 1, wherein the capsule is colored to resemble a prey fish's color.

9. A system of claim 1, wherein the capsule is colored so as to attract the selected population of fish.

10. A system of claim 1, wherein the capsule is made from material which is lethal to the selected population of fish.

11. A system of claim 1, wherein the death-resulting material in the capsule is a sponge material, which expands in the stomach of the predator fish ingesting it sufficiently to block the digestive track of the fish.

12. A method for controlling the number of a selected population of fish in a given aqueous environment, comprising the steps of:
   producing a capsule member which includes material which, following ingestion by a fish in the selected population, results in death of said selected population fish, wherein the capsule is made from a material which dissolves in the digestive fluids of said fish; and
   attaching the capsule to a prey fish and then releasing the prey fish into the aqueous environment, to be consumed by said selected population fish.

13. A method of claim 12, wherein said death causing material is lethal to the selected population of fish or sedates the fish so that they drown.

14. A method of claim 12, wherein the capsule member is covered with a substance which is not dissolvable in water.

15. A method of claim 12, wherein the capsule itself is not dissolvable in water.

16. A system for controlling the number of a selected population of fish in a given aqueous environment, comprising:
   a capsule member which includes material which, following ingestion by a fish in the selected population, results in death of said selected population fish, wherein the capsule is made from a material which dissolves in the digestive fluids of said fish, wherein the capsule is secured to a prey fish which is released into the aqueous environment for ingestion by said selected population fish, and
   wherein the death resulting material in the capsule is a sponge material, which expands in the stomach of the predator fish ingesting it sufficiently to block the digestive track of the fish.

17. A method for controlling the number of a selected population of fish in a given aqueous environment, comprising the steps of:
   producing a capsule member which includes material which, following ingestion by a fish in the selected population, results in death of said selected population fish, wherein the capsule is made from a material which dissolves in the digestive fluids of said fish, wherein the death resulting material in the capsule is a sponge material which expands in the stomach of the predator fish ingesting it sufficiently to block the digestive track of the fish; and
   attaching the capsule to a prey fish and then releasing the prey fish into the aqueous environment, to be consumed by said selected population fish.

* * * * *